United States Patent
Rao et al.

(10) Patent No.: US 9,374,178 B2
(45) Date of Patent: Jun. 21, 2016

(54) METHOD, SYSTEM AND DEVICE FOR DETERMINING TRANSPORT BLOCK SIZE

(71) Applicant: TEJAS NETWORKS LIMITED, Bangalore (IN)

(72) Inventors: Vetapalem Kesava Rao, Bangalore (IN); Sudarshana Vardappa, Bangalore (IN); Sriram N. Suresh, Bangalore (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 88 days.

(21) Appl. No.: 14/231,645

(22) Filed: Mar. 31, 2014

(65) Prior Publication Data

US 2014/0293811 A1 Oct. 2, 2014

(51) Int. Cl.
*H04B 17/309* (2015.01)
*H04W 52/26* (2009.01)
*H04W 52/24* (2009.01)

(52) U.S. Cl.
CPC .......... *H04B 17/309* (2015.01); *H04W 52/262* (2013.01); *H04W 52/241* (2013.01)

(58) Field of Classification Search
None
See application file for complete search history.

(56) References Cited

U.S. PATENT DOCUMENTS

| | | | | |
|---|---|---|---|---|
| 2010/0067450 A1* | 3/2010 | Balachandran | ........ | H04B 7/024 370/329 |
| 2012/0008574 A1* | 1/2012 | Xiao | ...................... | H04L 1/0007 370/329 |
| 2012/0287883 A1* | 11/2012 | Sabella | ................. | H04L 1/0003 370/329 |
| 2012/0311397 A1* | 12/2012 | Kim | ...................... | H04L 1/0065 714/752 |
| 2013/0343290 A1* | 12/2013 | Ren | ....................... | H04L 1/0003 370/329 |
| 2015/0071099 A1* | 3/2015 | Yi | ........................ | H04B 7/2656 370/252 |
| 2015/0124736 A1* | 5/2015 | Ko | ....................... | H04B 7/0626 370/329 |

* cited by examiner

*Primary Examiner* — Min Jung
(74) *Attorney, Agent, or Firm* — Brundidge & Stanger, P.C.

(57) ABSTRACT

The present invention and its embodiments are made to provide for a feasible solution for determining transport block size in a wireless communication system. The method comprising of selecting plurality of transport block sizes near to the queue size of the user data and calculating the code rate for the plurality of selected transport block sizes and calculating code rate derived from Channel Quality Information (CQI) index. The method further comprising of comparing the code rates of the plurality of selected transport block sizes with the code rate derived from CQI index and filtering the selected transport block sizes having number of zero padding below a threshold value and having code rates equal or less than the code rate derived from CQI index and selecting one transport block for each modulation order from among the filtered transport block sizes which require lower number of Physical Resource Blocks (PRBs) to transmit. The method further comprising of determining one transport block size from among each modulation order by calculating the modulation order derived from CQI index to be used, such that the PRBs of the determined transport block size is less than a threshold value on comparison with the PRBs of other filtered transport block sizes having lower PRBs. The method further comprising of indicating the physical layer to transmit the user data with higher power if the modulation order of the determined transport block size is greater than the modulation order of the calculated modulation order derived from CQI.

6 Claims, 10 Drawing Sheets

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Figure 2

Table 7.1.7.2.1-1 as per 3GPP TS 36.213:Transport block size table (dimension 27×110)

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| . | | | | | | | | | | |
| . | | | | | | | | | | |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| . | | | | | | | | | | |
| . | | | | | | | | | | |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| . | | | | | | | | | | |
| . | | | | | | | | | | |
| 26 | 8248 | 8760 | 9528 | 10296 | 11064 | 11832 | 12576 | 13536 | 14112 | 14688 |

Figure 3a

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| . | | | | | | | | | | |
| . | | | | | | | | | | |
| 10 | 3752 | 3880 | 4008 | 4264 | 4392 | 4584 | 4776 | 4968 | 5160 | 5352 |
| . | | | | | | | | | | |

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 0 | 840 | 872 | 904 | 936 | 968 | 1000 | 1032 | 1032 | 1064 | 1096 |
| 1 | 1128 | 1160 | 1192 | 1224 | 1256 | 1288 | 1352 | 1384 | 1416 | 1416 |
| . | | | | | | | | | | |
| . | | | | | | | | | | |
| 8 | 4392 | 4584 | 4584 | 4776 | 4968 | 4968 | 5160 | 5352 | 5544 | 5544 |
| 9 | 4968 | 5160 | 5160 | 5352 | 5544 | 5736 | 5736 | 5992 | 6200 | 6200 |
| . | | | | | | | | | | |
| . | | | | | | | | | | |
| 25 | 19848 | 20616 | 20616 | 21384 | 22152 | 22920 | 23688 | 24496 | 24496 | 25456 |
| 26 | 22920 | 23688 | 24496 | 25456 | 25456 | 26416 | 27376 | 28336 | 29296 | 29296 |

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 0 | 1128 | 1160 | 1192 | 1224 | 1256 | 1256 | 1288 | 1320 | 1352 | 1384 |
| 1 | 1480 | 1544 | 1544 | 1608 | 1608 | 1672 | 1736 | 1736 | 1800 | 1800 |
| . | | | | | | | | | | |
| . | | | | | | | | | | |
| 6 | 4264 | 4392 | 4584 | 4584 | 4776 | 4776 | 4968 | 4968 | 5160 | 5160 |
| 7 | 4968 | 5160 | 5352 | 5352 | 5544 | 5736 | 5736 | 5992 | 5992 | 6200 |
| . | | | | | | | | | | |
| . | | | | | | | | | | |
| 26 | 30576 | 30576 | 31704 | 32856 | 32856 | 34008 | 35160 | 35160 | 36696 | 36696 |

Figure 3b

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| . | | | | | | | | | | |
| . | | | | | | | | | | |
| 5 | 4584 | 4584 | 4776 | 4776 | 4776 | 4968 | 4968 | 5160 | 5160 | 5352 |
| . | | | | | | | | | | |
| . | | | | | | | | | | |
| 26 | 37888 | 37888 | 39232 | 40576 | 40576 | 40576 | 42368 | 42368 | 43816 | 43816 |

| $I_{TBS}$ | $N_{PRB}$ | | | | | | | | | |
|---|---|---|---|---|---|---|---|---|---|---|
| | 61 | 62 | 63 | 64 | 65 | 66 | 67 | 68 | 69 | 70 |
| 0 | 1672 | 1736 | 1736 | 1800 | 1800 | 1800 | 1864 | 1864 | 1928 | 1928 |
| 1 | 2216 | 2280 | 2280 | 2344 | 2344 | 2408 | 2472 | 2472 | 2536 | 2536 |
| . | | | | | | | | | | |
| . | | | | | | | | | | |
| 26 | 45352 | 45352 | 46888 | 46888 | 48936 | 48936 | 48936 | 51024 | 51024 | 52752 |

| $I_{TBS}$ | $N_{PRB}$ | | | | | | | | | |
|---|---|---|---|---|---|---|---|---|---|---|
| | 71 | 72 | 73 | 74 | 75 | 76 | 77 | 78 | 79 | 80 |
| 0 | 1992 | 1992 | 2024 | 2088 | 2088 | 2088 | 2152 | 2152 | 2216 | 2216 |
| 1 | 2600 | 2600 | 2664 | 2728 | 2728 | 2792 | 2792 | 2856 | 2856 | 2856 |
| . | | | | | | | | | | |
| . | | | | | | | | | | |
| 4 | 5160 | 5160 | 5160 | 5352 | 5352 | 5544 | 5544 | 5544 | 5736 | 5736 |
| . | | | | | | | | | | |
| . | | | | | | | | | | |
| 26 | 52752 | 52752 | 55056 | 55056 | 55056 | 55056 | 57336 | 57336 | 57336 | 59256 |

Figure 3c

| $I_{TBS}$ | $N_{PRB}$ | | | | | | | | | |
|---|---|---|---|---|---|---|---|---|---|---|
| | 81 | 82 | 83 | 84 | 85 | 86 | 87 | 88 | 89 | 90 |
| 0 | 2280 | 2280 | 2280 | 2344 | 2344 | 2408 | 2408 | 2472 | 2472 | 2536 |
| 1 | 2984 | 2984 | 2984 | 3112 | 3112 | 3112 | 3240 | 3240 | 3240 | 3240 |
| 2 | 3624 | 3624 | 3752 | 3752 | 3880 | 3880 | 3880 | 4008 | 4008 | 4008 |
| 3 | 4776 | 4776 | 4776 | 4968 | 4968 | 4968 | 5160 | 5160 | 5160 | 5352 |
| . | | | | | | | | | | |
| . | | | | | | | | | | |
| 26 | 59256 | 59256 | 61664 | 61664 | 61664 | 63776 | 63776 | 63776 | 66592 | 66592 |

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 0 | 2536 | 2536 | 2600 | 2600 | 2664 | 2664 | 2728 | 2728 | 2728 | 2792 |
| 1 | 3368 | 3368 | 3368 | 3496 | 3496 | 3496 | 3496 | 3624 | 3624 | 3624 |
| . | | | | | | | | | | |
| . | | | | | | | | | | |
| 26 | 66592 | 68808 | 68808 | 68808 | 71112 | 71112 | 71112 | 73712 | 73712 | 75376 |

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| . | | | | | | | | | | |
| . | | | | | | | | | | |
| 26 | 75376 | 75376 | 75376 | 75376 | 75376 | 75376 | 75376 | 75376 | 75376 | 75376 |

Figure 3d

Modulation and TBS index table for Physical Downlink Shared Channel (PDSCH)

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

Figure 4

| S.No | TBSize | TBIdx | MCSIdx | ModOrder | NumPRB | coderate |
|---|---|---|---|---|---|---|
| 1 | 5160 | 26 | 28 | 6 | 7 | 0.853175 |
| 2 | 5160 | 25 | 27 | 6 | 8 | 0.746528 |
| 3 | 5160 | 23 | 25 | 6 | 9 | 0.66358 |
| 4 | 5352 | 22 | 24 | 6 | 10 | 0.597222 |
| 5 | 5160 | 20 | 22 | 6 | 11 | 0.542929 |
| 6 | 5160 | 19 | 21 | 6 | 12 | 0.497685 |
| 7 | 5160 | 18 | 20 | 6 | 13 | 0.459402 |
| 8 | 5160 | 17 | 19 | 6 | 14 | 0.426587 |
| 9 | 5160 | 16 | 18 | 6 | 16 | 0.373264 |
| 10 | 5160 | 15 | 17 | 6 | 17 | 0.351307 |
| 11 | 5160 | 14 | 15 | 4 | 18 | 0.497685 |
| 12 | 5160 | 13 | 14 | 4 | 20 | 0.447917 |
| 13 | 5160 | 10 | 11 | 4 | 29 | 0.308908 |
| 14 | 5160 | 9 | 9 | 2 | 32 | 0.559896 |
| 15 | 5160 | 9 | 10 | 4 | 32 | 0.279948 |
| 16 | 5160 | 9 | 9 | 2 | 33 | 0.542929 |
| 17 | 5160 | 9 | 10 | 4 | 33 | 0.271465 |
| 18 | 5160 | 8 | 8 | 2 | 37 | 0.484234 |
| 19 | 5160 | 7 | 7 | 2 | 42 | 0.426587 |
| 20 | 5160 | 6 | 6 | 2 | 49 | 0.365646 |
| 21 | 5160 | 5 | 5 | 2 | 59 | 0.303672 |
| 22 | 5160 | 4 | 4 | 2 | 71 | 0.252347 |
| 23 | 5160 | 4 | 4 | 2 | 72 | 0.248843 |
| 24 | 5160 | 4 | 4 | 2 | 73 | 0.245434 |
| 25 | 5160 | 3 | 3 | 2 | 87 | 0.205939 |
| 26 | 5160 | 3 | 3 | 2 | 88 | 0.203598 |
| 27 | 5160 | 3 | 3 | 2 | 89 | 0.201311 |

Figure 5

Selected TB Sizes for QPSK (Quadrature phase shift keying) Modulation

| S.No | TBSize | TBIdx | MCSIdx | ModOrder | NumPRB | coderate |
|---|---|---|---|---|---|---|
| 1 | 5160 | 4 | 4 | 2 | 71 | 0.252347 |
| 2 | 5160 | 4 | 4 | 2 | 72 | 0.248843 |
| 3 | 5160 | 4 | 4 | 2 | 73 | 0.245434 |
| 4 | 5160 | 3 | 3 | 2 | 87 | 0.205939 |
| 5 | 5160 | 3 | 3 | 2 | 88 | 0.203598 |
| 6 | 5160 | 3 | 3 | 2 | 89 | 0.201311 |

Figure 6

Selected TB Sizes for 16QAM (Quadrature amplitude modulation)

| S.No | TBSize | TBIdx | MCSIdx | ModOrder | NumPRB | coderate |
|---|---|---|---|---|---|---|
| 7 | 5160 | 9 | 10 | 4 | 32 | 0.279948 |
| 8 | 5160 | 9 | 10 | 4 | 33 | 0.271465 |

Figure 7

| S.No | TBSize | TBIdx | MCSIdx | ModOrder | NumPRB | coderate |
|---|---|---|---|---|---|---|
| 1 | 5160 | 4 | 4 | 2 | 71 | 0.252347 |
| 7 | 5160 | 9 | 10 | 4 | 32 | 0.279948 |

Figure 8

METHOD, SYSTEM AND DEVICE FOR DETERMINING TRANSPORT BLOCK SIZE

FIELD OF THE INVENTION

The present disclosure relates to determining transport block sizes in wireless communication systems and particularly for determining transport block sizes for optimizing number of resource allocations.

BACKGROUND

The Long Term Evolution (LTE) is a new terrestrial mobile communication standard currently being standardized by the 3GPP ($3^{rd}$ Generation Partnership Project). The Radio Access Network (RAN) of LTE is named as the Evolved-Universal Terrestrial Radio Access Network (E-UTRAN). The E-UTRAN physical layer is based on Orthogonal Frequency Division Multiplexing (OFDM). More precisely; the downlink transmission scheme is based on conventional OFDM using a cyclic prefix while the uplink transmission is based on single carrier frequency division multiple access (SC-FDMA) techniques. LTE supports both frequency division duplex (FDD) and time division duplex (TDD).

Data in terms of bits are transported from eNodeB to user equipment (UE) in the downlink direction and UE to eNodeB in the uplink direction. If we consider only uplink flow from UE to eNodeB then data is first received by Packet data convergence protocol (PDCP) layer and after performing compression and ciphering and/or integrity if applicable, will pass on the data to the Radio Link Control(RLC) Layer. Medium Access Control (MAC) will give the grant to the RLC layer for Radio Link Control Protocol Data Unit (RLC PDU) formation. RLC layer will concatenate or segment the data coming from PDCP layer into correct block size (block size will be given to RLC by MAC Scheduler in terms of grant) and forward RLC PDU to the MAC layer with its own header.

Now MAC layer selects the modulation and coding scheme and configures the physical layer. The data is now in the shape of transport block size and needed to be transmitted in 1 milli second (ms) subframe. Since the size of transport block is not fixed, the bit streams referred to as user Queue size will not be exactly equivalent to the possible transport block sizes given in 3GPP Technical Specification 36.213 V9.3 Table 7.1.7.2.1-1. Therefore to match the user data to the selected transport block size, zeroes will be appended to the user data. The transport block size which has less number of zero padding may require more resources for transmission. Therefore there is a need for determining appropriate transport block size to avoid more zero padding, to reduce overhead and increase throughput.

SUMMARY

The summary represents the simplified condensed version of the claimed subject matter and it is not an extensive disclosure of the claimed subject matter. The summary neither identifies key or critical elements nor delineates the scope of the claimed subject matter. The summary presents the simplified form of the claimed subject matter and acts as a prelude to the detailed description that is given below. The present invention and its embodiments are made to provide for a feasible solution for determining transport block size in a wireless communication system. The method comprising of selecting plurality of transport block sizes near to the queue size of the user data and calculating the code rate for the plurality of selected transport block sizes and calculating code rate derived from Channel Quality Information (CQI) index. The method further comprising of comparing the code rates of the plurality of selected transport block sizes with the code rate derived from CQI index and filtering the selected transport block sizes having number of zero padding below a threshold value and having code rates equal or less than the code rate derived from CQI index and selecting one transport block for each modulation order from among the filtered transport block sizes which requires lower number of Physical Resource Blocks (PRBs) to transmit.

The method further comprising of determining one transport block size from among each modulation order by calculating the modulation order derived from CQI index to be used, such that the PRBs of the determined transport block size is less than a threshold value on comparison with the PRBs of other filtered transport block sizes having lower PRBs. The method further comprising of indicating the physical layer to transmit the user data with higher power if the modulation order of the determined transport block size is greater than the modulation order of the calculated modulation order derived from CQI.

Another aspect relates to system facilitating the above method of determining transport block size in a wireless communication system. Another aspect relates to eNodeB facilitating the above method of determining transport block size in a wireless communication system.

Other aspects, advantages, and salient features of the invention will become apparent to those skilled in the art from the following detailed description, which, taken in conjunction with the annexed drawings, discloses exemplary embodiments of the invention.

DESCRIPTION OF THE DRAWINGS

The features, advantages and other aspects of the embodiments of the present invention will be obvious to any person skilled in the art to appreciate the invention when read with the following description taken in conjunction with the accompanying drawings.

FIG. 2 is the reproduction of the Table 7.2.3-1: 4 bit CQI Table of the 3GPP Technical Specification 36.213.

FIGS. 3a to 3d is the reproduction of the condensed version of table 7.1.7.2.1-1 of 3GPP Technical Specification 36.213, wherein FIG. 3b is in continuation of 3a; FIG. 3c is in continuation of 3b; and FIG. 3d is in continuation of 3c.

FIG. 4 is the reproduction of Table 7.1.7.1-1 of 3GPP Technical Specification 36.213 representing Modulation and TBS index table for Physical Downlink Shared Channel (PDSCH).

FIG. 5 is a table showing selected plurality of TB Sizes, with TBS index, MCS index, Modulation Order and Number of PRBs in accordance with the exemplary embodiments of the invention.

FIG. 6 is a table showing selected TB Sizes for Quadrature Phase Shift Keying (QPSK) Modulation in accordance with the exemplary embodiments of the invention.

FIG. 7 is a table showing selected TB Sizes for Quadrature Amplitude Modulation (16QAM) in accordance with the exemplary embodiments of the invention.

FIG. 8 is a table showing selected TB sizes from each modulation order from FIGS. 6 and 7 in accordance with the exemplary embodiments of the invention.

The figures are not drawn to scale and are illustrated for simplicity and clarity to help understand the various embodiments of the present invention. Throughout the drawings it should be noted that like reference numbers are used to depict the same or similar elements, features and structures.

DESCRIPTION

Figure 1:
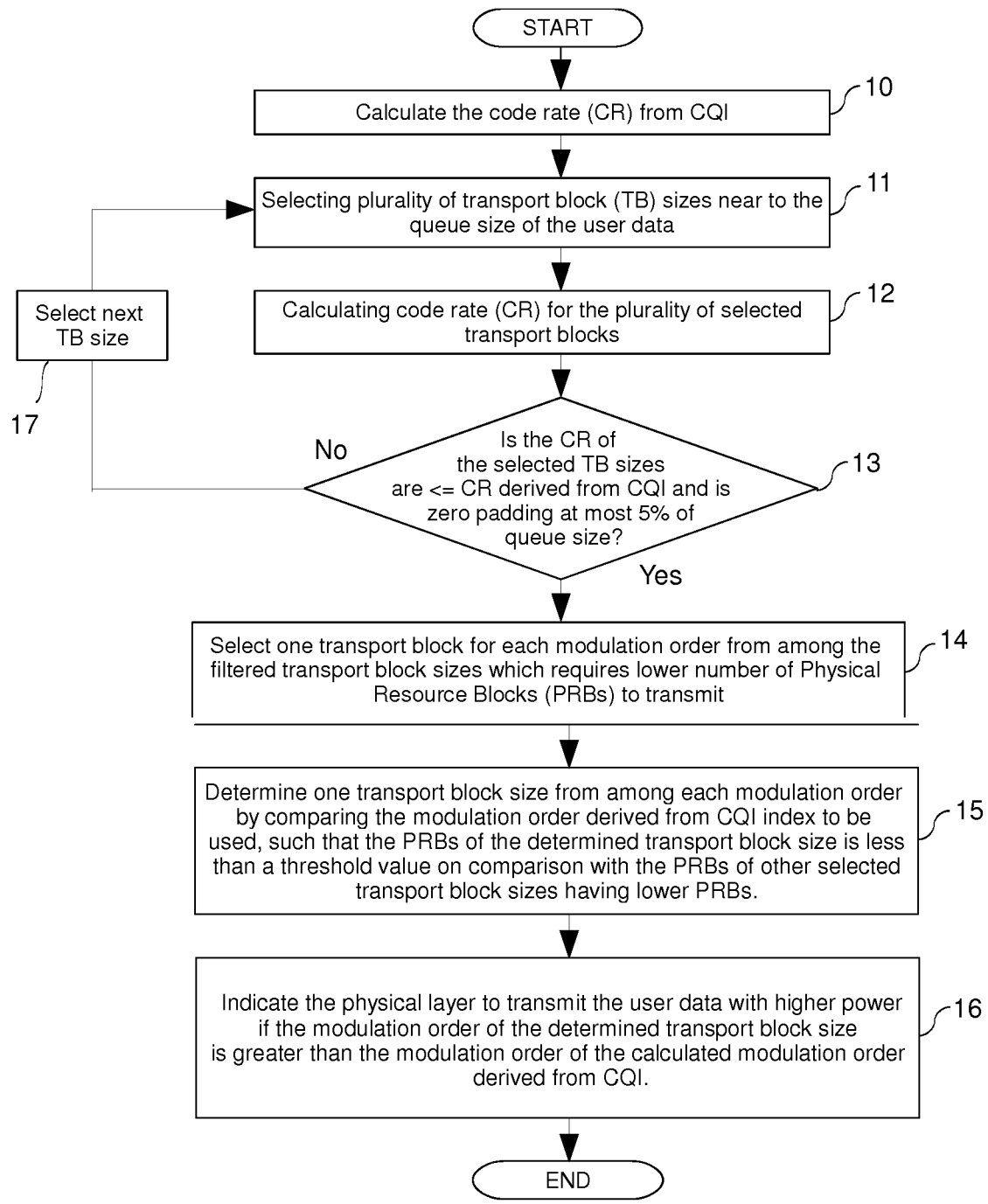
FIG. 1 is a flow chart determining transport block size in a wireless communication system in accordance with the exemplary embodiments of the invention.

The following descriptions with reference to the accompanying drawing are provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

The present invention and its embodiments are mainly described in relation to $3^{rd}$ Generation Partnership Project (3GPP) Long Term Evolution (LTE) specifications and standards (LTE) and more particularly 3GPP TS 36.213 for the applicability of certain exemplary embodiments. The above said 3GPP LTE TS 36.213 serve as a prior art for the described invention. For exemplary purposes only, most of the embodiments are outlined according to the LTE mobile communication system with the solution to the problem discussed in the background. The terminology used is therefore related thereto. Such terminology is used in the context of describing the embodiments of the invention and it does not limit the invention in any way. Any other network architecture or system deployment, etc., may be applicable for/in any kind of modern and future communication network including any mobile/wireless communication networks/systems as long as it is compliant with the features described herein.

The techniques described herein may be used for various wireless communication networks such as Code Division Multiple Access (CDMA) networks, CDMA implementing radio technology such as Universal Terrestrial Radio Access (UTRA), Time Division Multiple Access (TDMA) networks, TDMA implementing radio technology such as GSM (Global System for Mobile Communication), Frequency Division Multiple Access (FDMA) networks, Orthogonal Frequency Division Multiple Access (OFDMA) networks, OFDMA implementing radio technology such as Evolved Universal Terrestrial Radio Access URTA (E-UTRA), Single Carrier (SC)-FDMA networks. This invention is applicable to Frequency Division Duplex (FDD) as well as Time Division Duplex (TDD).

User equipment (UE) used in the following description denotes various terminologies used like an access terminal (AT), wireless communication device, terminal, wireless handset, computer or wireless module, wireless module for use with a computer, personal digital assistant (PDA), tablet computer or device.

In 3GPP LTE, a Base station may be referred to as evolved Node B or eNodeB. For the sake of simplicity and brevity in the following description the term eNodeB used generically to mean the functions performed by nodes referred to in the context of explaining functions associated with a Base station , Access Point, a Node B, an enhanced Node B, Base station, Evolved Node B, eNB, radio access stations (RASs), or Base Transceiver Stations (BTSs) and the like.

According to prior art, transport block size is determined by selecting a transport block size near to the queue size (i.e., user data) from the Table 7.1.7.2.1-1 of 3GPP Technical Specification (TS) 36.213. FIG. 1 is a flow chart explaining the process involved in determining transport block size in a wireless communication system in accordance with the exemplary embodiments of the invention. The functionality described below may be performed by a scheduling device within an eNodeB. The scheduling device may be a MAC scheduler. The feedback Channel Quality Information (CQI) and the measurement information of Signal to Interference and Noise Ratio (SINR) and the Received Signal Strength Indicator (RSSI) will be available at the eNodeB. The received CQI will be derived by the UE based on the Downlink Channel condition. The embodied functionality provide for calculating the Code Rate at 10 supported from the received Channel Quality Information as per Table 1 in FIG. 2.

As an example if the CQI index is 4, the code rate is calculated as 0.3007 (i.e., 308/1024). The eNodeB has the user data available for transmission in the form of Queue size. For the sake of illustration, an assumption can be made that the user data available at eNodeB for transmission in the form of queue size is 5000 bits. At 11 using the queue size of the user (i.e., 5000 bits), a plurality of transport block (TB) sizes near to the queue size (for example 5160. 5352. 5544 or 5992 of the user data is selected as per Table 2, parts 1-4 as shown in FIGS. 3a to 3d.

From the above Table 2, parts 1-4 as shown in FIGS. 3a to 3d, a plurality of transport block (TB) sizes near to the queue size (for example 5160. 5352. 5544 or 5992) of the user data is selected and listed in a table by mapping Modulation and Coding Scheme(MCS) index, Modulation order from Table 3 in FIG. 4.

From the above two Tables (i.e., table 2, parts 1-4 as shown in FIGS. 3a to 3d and table 3 in FIG. 4) the plurality of transport block (TB) sizes selected near to the queue size (i.e., 5160) of the user data is listed in the table 4 of FIG. 5 arranged with reference to its TB size index, MCS Index, Modulation Order and number of Physical Resource Blocks (PRBs).

At 12 the code rates for the plurality of selected transport block sizes are determined as known in prior art by dividing the transport block size with the number of available bits. The numbers of available bits are the product of number of available Resource Elements and the Modulation order. For the purposes of illustration, code rate for data listed in S.No: 15 in the table 4 of FIG. 5, is arrived as 0.279948 (i.e., 5160/32*12*12*4) wherein the transport block size is 5160, number of PRBs are 32, number of available Resource Elements are 32*12*12 (wherein number of resource elements are the product of 'number of PRBs, number of Sub Carrier (SC) per Resource Block (RB) (i.e., 12) and number of Symbols for Data (i.e.,14-2~=12) and the Modulation order being 4.

At 13, the code rates of the plurality of selected transport block sizes are compared with the code rate derived from CQI index (i.e., 0.3007). If the code rates derived for each of the plurality of selected transport block sizes in 12 are less than or equal to the code rate derived in 10 i.e., code rate derived from CQI index (0.3007) and if the number of zero padding [as an example queue size=5000 bits, selected TB size=5160 bits, therefore percentage of zero padding is (160/5000)

100=3.2%] is less than five(5) percent of the TB size then the TB sizes satisfying the above conditions are filtered. In the illustrated example, the filtered TB sizes satisfying the above conditions are listed in S.Nos: 15, 17, 22, 23, 24, 25, 26 and 27 of table 4 in FIG. 5.

If the above conditions are not met, then the process of selecting TB sizes nearer to the queue size of the user data and calculating the code rate, comparing etc., are repeated (as shown at 17) till the TB sizes matching the threshold limits (i.e., zero padding atmost five (5) percent and the code rate at 12 is less than the code rate derived from CQI index at 10) are filtered.

The filtered TB size groups at 13 are listed according to similar modulation orders as shown in table 5 of FIG. 6 and table 6 of FIG. 7. As the filtered TB size groups satisfies the code rate and minimum zero padding criteria, about one TB size from each modulation order from table 5 of FIG. 6 and table 6 of FIG. 7, which require lower number of PRBs to transmit are selected at 14. The selected TB sizes (S. No. 1 and 7) from among the filtered TB size groups at 13 are as shown in table 7 of FIG. 8.

At 15, the modulation order to be used from the received CQI is calculated (i.e., it is 2 (QPSK) for CQI index 4). An appropriate transport block size is determined from among the selected TB sizes (S. No. 1 and 7) as listed above, by comparing the modulation order derived from CQI index to be used, such that the PRBs of the determined transport block size is less than a threshold value on comparison with the PRBs of other selected TB sizes (i.e., S. No. 1 and 7 as listed above). The exemplary embodiment provides for the threshold value of PRBs at 30 (thirty) percent. The PRBs required for TB size in S. No. 1 is 71 and the PRBs required for TB size in S. No. 7 is 32 and which takes 45.07% (i.e., 32/71) more resources for transmission. In the illustrated case, transport block size associated with S. No. 7 is determined as the appropriate TB size since the required PRBs (32) to transmit is within the threshold value when compared with the required PRB (71) to transmit for the transport block size associated with S. No. 1.

At 16, the physical layer is indicated to transmit the user data with higher power if the modulation order of the determined transport block size is greater than the modulation order of the calculated modulation order derived from CQI. In the illustrated case, the modulation order of the determined transport block size is 4 which is greater than the modulation order of the calculated modulation order derived from CQI. The exemplary embodiments provide for the indication by means of setting 'Power boosting Flag' as 1 if the modulation order of the determined transport block size is greater than the modulation order of the calculated modulation order derived from CQI. The 'Power boosting Flag' is set as '0' if the modulation order of the determined transport block size is not greater than the modulation order of the calculated modulation order derived from CQI.

All the exemplary calculations described above will be preferably part of the MAC Layer and may be performed by the scheduling device within an eNodeB. The scheduling device may be a MAC scheduler. The MAC Layer will interact with the physical layer through TB size, power boost Flag, number of PRBs, MCS index etc. The power boosting parameter will indicate to the physical layer to transmit the user data with higher power than the usual. MAC Layer requests the RLC to form the PDU and MAC will generate the MAC PDU from the RLC PDU and pass it to the physical layer for encoding and transmission subject to MAC PDU equal to TB Size.

The proposed method will consider Channel quality of the downlink to select the Transport Block with minimum zero padding and indicates the power boost parameter to the physical layer if the higher modulation order is selected. The problem of more zero padding to form the MAC PDU has been eliminated. This offers best performance by reducing overhead and increasing throughput.

Figure 9:
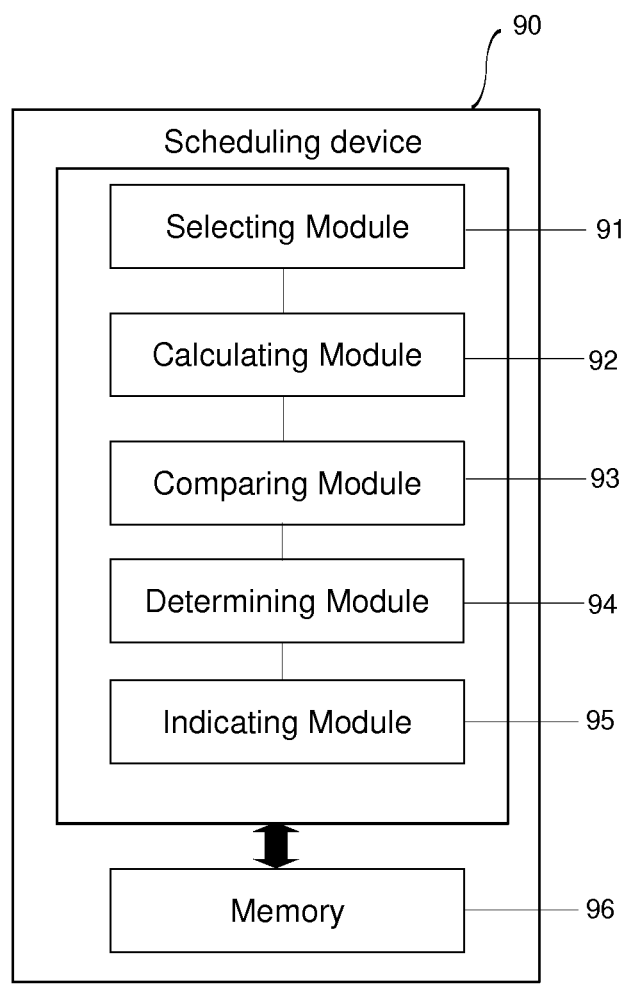
FIG. 9 is a block diagram representing the functions performed by a scheduling device within an eNodeB in accordance with the exemplary embodiments of the invention.

FIG. 9 is a block diagram representing the functions performed by a scheduling device 90 within an eNodeB in accordance with the exemplary embodiments of the invention. The scheduling device 90 within an eNodeB comprises of: a selecting module 91, adapted to select plurality of transport block sizes near to the queue size of the user data and adapted to calculate the code rate for the plurality of selected transport block sizes and to select one transport block for each modulation order from among the filtered transport block sizes which requires lower number of Physical Resource Blocks (PRBs) to transmit; a calculating module 92, adapted to calculate code rate derived from Channel Quality Information (CQI) index; a comparing module 93, adapted to compare the code rates of the plurality of selected transport block sizes with the code rate derived from CQI index and filtering the selected transport block sizes having number of zero padding below five (5) percent and having code rates equal or less than the code rate derived from CQI index; a determining module 94, adapted to determine one transport block size from among each modulation order by calculating the modulation order derived from CQI index to be used, such that the PRBs of the determined transport block size is less than thirty (30) percent on comparison with the PRBs of other filtered transport block sizes having lower PRBs; and an indicating module 95, adapted to indicate the physical layer to transmit the user data with higher power if the modulation order of the determined transport block size is greater than the modulation order of the calculated modulation order derived from CQI.

Scheduling device 90 may also include a memory 96 that retains instructions for executing functions associated with modules 91, 92, 93, 94 and 95, as well as measured or computed data that may be generated during executing such functions.

Memory described above can be any storage device including any kind of computer readable storage media, for example, RAM, EPROM, EEPROM, flash memory, registers, hard disks, CD-ROM, DVD, etc.

Another embodiment of the invention relates to the implementation of the above described various embodiments using hardware and software. It is recognized that the various embodiments of the invention may be implemented or performed using computing devices (processors). A computing device or processor may for e.g., be general purpose processors, digital signal processors (DSP), application specific integrated circuits (ASIC), field programmable gate arrays (FPGA) or other programmable logic devices, etc. The various embodiments of the invention may also be performed or embodied by a combination of these devices. Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention. It would be appreciated by a person skilled in the art that

We claimed:

1. A method for determining transport block size in a wireless communication system comprising of:
   selecting plurality of transport block sizes near to the queue size of the user data and calculating the code rate for the plurality of selected transport block sizes;
   calculating a code rate proportionally derived from Channel Quality Information (CQI) index;
   comparing the code rates of the plurality of selected transport block sizes with the code rate derived from CQI index and filtering the selected transport block sizes having number of zero padding below a threshold value and having code rates equal or less than the code rate derived from CQI index;
   selecting one transport block for each modulation order from among the filtered transport block sizes which requires a minimal number of Physical Resource Blocks (PRBs) to transmit;
   determining one transport block size from among each modulation order by calculating the modulation order derived from CQI index to be used, such that the PRBs of the determined transport block size is less than a threshold value on comparison with the PRBs of other filtered transport block sizes having lower PRBs.

2. The method of claim 1 further comprising of indicating the physical layer to transmit the user data with maximal power if the modulation order of the determined transport block size is greater than the modulation order of the calculated modulation order derived from CQI.

3. The method of claim 1 wherein, the threshold value of zero padding is less than five (5) percent.

4. A method of claim 1 wherein, the threshold value of PRBs is at least thirty (30) percent.

5. The eNodeB comprising of a scheduling device for determining transport block size in a wireless communication system comprising of:
   a selecting module, adapted to select plurality of transport block sizes near to the queue size of the user data and calculating the code rate for the plurality of selected transport block sizes and to select one transport block for each modulation order from among the filtered transport block sizes which requires a minimal number of Physical Resource Blocks (PRBs) to transmit;
   a calculating module, adapted to calculate a code rate proportionally derived from Channel Quality Information (CQI) index;
   a comparing module, adapted to compare the code rates of the plurality of selected transport block sizes with the code rate derived from CQI index and filtering the selected transport block sizes having number of zero padding below five (5) percent and having code rates equal or less than the code rate derived from CQI index;
   a determining module, adapted to determine one transport block size from among each modulation order by calculating the modulation order derived from CQI index to be used, such that the PRBs of the determined transport block size is less than thirty (30) percent on comparison with the PRBs of other filtered transport block sizes having lower PRBs; and
   an indicating module, adapted to indicate the physical layer to transmit the user data with higher power if the modulation order of the determined transport block size is greater than the modulation order of the calculated modulation order derived from CQI.

6. The Wireless communication system comprising of:
   an eNodeB comprising of a scheduling device for determining transport block size in a wireless communication system comprising of:
   a selecting module, adapted to select plurality of transport block sizes near to the queue size of the user data and calculating the code rate for the plurality of selected transport block sizes and to select one transport block for each modulation order from among the filtered transport block sizes which requires a minimal number of Physical Resource Blocks (PBRs) to transmit;
   a calculating module, adapted to calculate a code rate proportionally derived from Channel Quality Information (CQI) index;
   a comparing module, adapted to compare the code rates of the plurality of selected transport block sizes with the code rate derived from CQI index and filtering the selected transport block sizes having number of zero padding below five (5) percent and having code rates equal or less than the code rate derived from CQI index;
   a determining module, adapted to determine one transport block size from among each modulation order by calculating the modulation order derived from CQI index to be used, such that the PRBs of the determined transport block size is less than thirty (30) percent on comparison with the PRBs transport block sizes having lower PRBs; and
   an indicating module, adapted to indicate the physical layer to transmit the user data with higher power if the modulation order of the determined transport block size is greater than the modulation order of the calculated modulation order derived from CQI.

* * * * *